(12) United States Patent
Kao

(10) Patent No.: US 9,205,552 B2
(45) Date of Patent: Dec. 8, 2015

(54) MAGNETIC HANGING FRAME FOR HAND TOOLS

(71) Applicant: Jui-Chien Kao, Taichung (TW)

(72) Inventor: Jui-Chien Kao, Taichung (TW)

( * ) Notice: Subject to any disclaimer, the term of this patent is extended or adjusted under 35 U.S.C. 154(b) by 130 days.

(21) Appl. No.: 14/159,096

(22) Filed: Jan. 20, 2014

(65) Prior Publication Data

US 2015/0202767 A1    Jul. 23, 2015

(51) Int. Cl.
*B25H 3/04*    (2006.01)
*F16M 13/02*    (2006.01)

(52) U.S. Cl.
CPC ............. *B25H 3/04* (2013.01); *F16M 13/022* (2013.01)

(58) Field of Classification Search
CPC ............ B65H 3/04; B65H 3/003; B65H 3/06; B65H 3/02; B65H 3/021; A47F 5/0846; A47F 5/0838; A47F 5/0807; A47F 5/0006; A47F 5/0853; B25B 11/002; B25B 13/06; B25B 13/56; F16M 13/022
USPC ................. 211/70.6, 60.1; 206/372, 376, 377
See application file for complete search history.

(56) References Cited

U.S. PATENT DOCUMENTS

| | | | | |
|---|---|---|---|---|
| 3,980,384 A * | 9/1976 | Lawson | ........................ | 439/710 |
| 4,927,020 A * | 5/1990 | Randy | ............................ | 206/378 |
| 5,284,245 A * | 2/1994 | Slivon et al. | .................. | 206/378 |
| 5,544,747 A * | 8/1996 | Horn | ............................. | 206/378 |
| 5,573,116 A * | 11/1996 | Zink | .............................. | 206/378 |
| 5,645,177 A * | 7/1997 | Lin | ............................... | 211/70.6 |
| 6,431,373 B1 * | 8/2002 | Blick | ............................ | 211/70.6 |
| 6,488,151 B2 * | 12/2002 | Ramsey et al. | ................ | 206/378 |
| 7,798,336 B2 * | 9/2010 | Shiao | ............................ | 211/70.6 |
| 7,841,480 B2 * | 11/2010 | Hsieh | ............................ | 211/70.6 |
| 7,905,354 B1 * | 3/2011 | Geibel | .......................... | 206/378 |
| 8,069,995 B2 * | 12/2011 | Winnard | ....................... | 211/70.6 |
| 8,336,709 B1 * | 12/2012 | Geibel | .......................... | 206/378 |
| 8,733,561 B2 * | 5/2014 | Kao | ............................... | 211/70.6 |
| 8,813,957 B1 * | 8/2014 | Kao | ............................... | 206/378 |
| 2005/0247653 A1 * | 11/2005 | Brooks | ....................... | 211/94.01 |
| 2006/0219647 A1 * | 10/2006 | Shih | .............................. | 211/70.6 |
| 2007/0210021 A1 * | 9/2007 | Whitehead et al. | ........... | 211/70.6 |
| 2008/0251476 A1 * | 10/2008 | Shiao | ............................ | 211/70.6 |
| 2010/0065520 A1 * | 3/2010 | Hsieh | ............................ | 211/70.6 |
| 2010/0314978 A1 * | 12/2010 | Manalang et al. | ............. | 312/243 |
| 2011/0192810 A1 * | 8/2011 | Kao | ............................... | 211/70.6 |
| 2013/0306581 A1 * | 11/2013 | Kao | ............................... | 211/49.1 |
| 2015/0034572 A1 * | 2/2015 | Kao | ............................... | 211/13.1 |

* cited by examiner

*Primary Examiner* — Patrick Hawn
(74) *Attorney, Agent, or Firm* — C. G. Mersereau; Nikolai & Mersereau, P.A.

(57) ABSTRACT

A magnetic hanging frame for hand tools has a track disc, at least one holding element and at least two magnetic devices. The track disc has a baseboard, a track formed on and protruding from a front surface of the baseboard and a mounting rack formed on and protruding from a rear surface of the baseboard. The at least one holding element is slidably mounted on the track. The at least two magnetic devices are connected to the track disc, and each one of the at least two magnetic devices has a magnet mount and two locating mounts. The magnet mount is mounted in the mounting rack and has a magnetic body and two extending wings. The locating mounts are mounted in the mounting rack beside the magnet mount, abut against the magnet mount and each one of the locating mounts has a locating groove and a middle protrusion.

16 Claims, 9 Drawing Sheets

MAGNETIC HANGING FRAME FOR HAND TOOLS

BACKGROUND OF THE INVENTION

1. Field of the Invention

The present invention relates to a magnetic hanging frame, and more particularly to a magnetic hanging frame for hand tools that can be conveniently mounted on a sidewall of a tool cabinet or a display frame without fasteners.

2. Description of the Prior Art

A conventional hanging frame for hand tools has a track disc and multiple holding elements. The track disc has a baseboard, a track and two hanging holes. The baseboard is elongated and has a front surface. The track is formed on and protrudes from the front surface of the baseboard. The hanging holes are formed through the baseboard and can be mounted on a wall with two fasteners or two hooks mounted through the hanging holes. The holding elements are slidably mounted on the track and can be used to hold hand tools with the baseboard.

However, though the conventional hanging frame can hold the hand tools, the conventional hanging frame cannot be mounted on a sidewall of a tool cabinet or a display frame without using fasteners or hooks, and this is inconvenient in use.

To overcome the shortcomings, the present invention provides a magnetic hanging frame for hand tools to mitigate the aforementioned problems.

SUMMARY OF THE INVENTION

The main objective of the present invention is to provide a magnetic hanging frame for hand tools that can be conveniently mounted on a sidewall of a tool cabinet or a display frame without fasteners.

The magnetic hanging frame for hand tools in accordance with the present invention has a track disc, at least one holding element and at least two magnetic devices. The track disc has a baseboard, a track formed on and protruding from a front surface of the baseboard and a mounting rack formed on and protruding from a rear surface of the baseboard. The at least one holding element is slidably mounted on the track. The at least two magnetic devices are connected to the track disc, and each one of the at least two magnetic devices has a magnet mount and two locating mounts. The magnet mount is mounted in the mounting rack and has a magnetic body and two extending wings. The locating mounts are mounted in the mounting rack beside the magnet mount, abut against the magnet mount and each one of the locating mounts has a locating groove and a middle protrusion.

Other objects, advantages and novel features of the invention will become more apparent from the following detailed description when taken in conjunction with the accompanying drawings.

DETAILED DESCRIPTION OF THE PREFERRED EMBODIMENT

Figure 1:
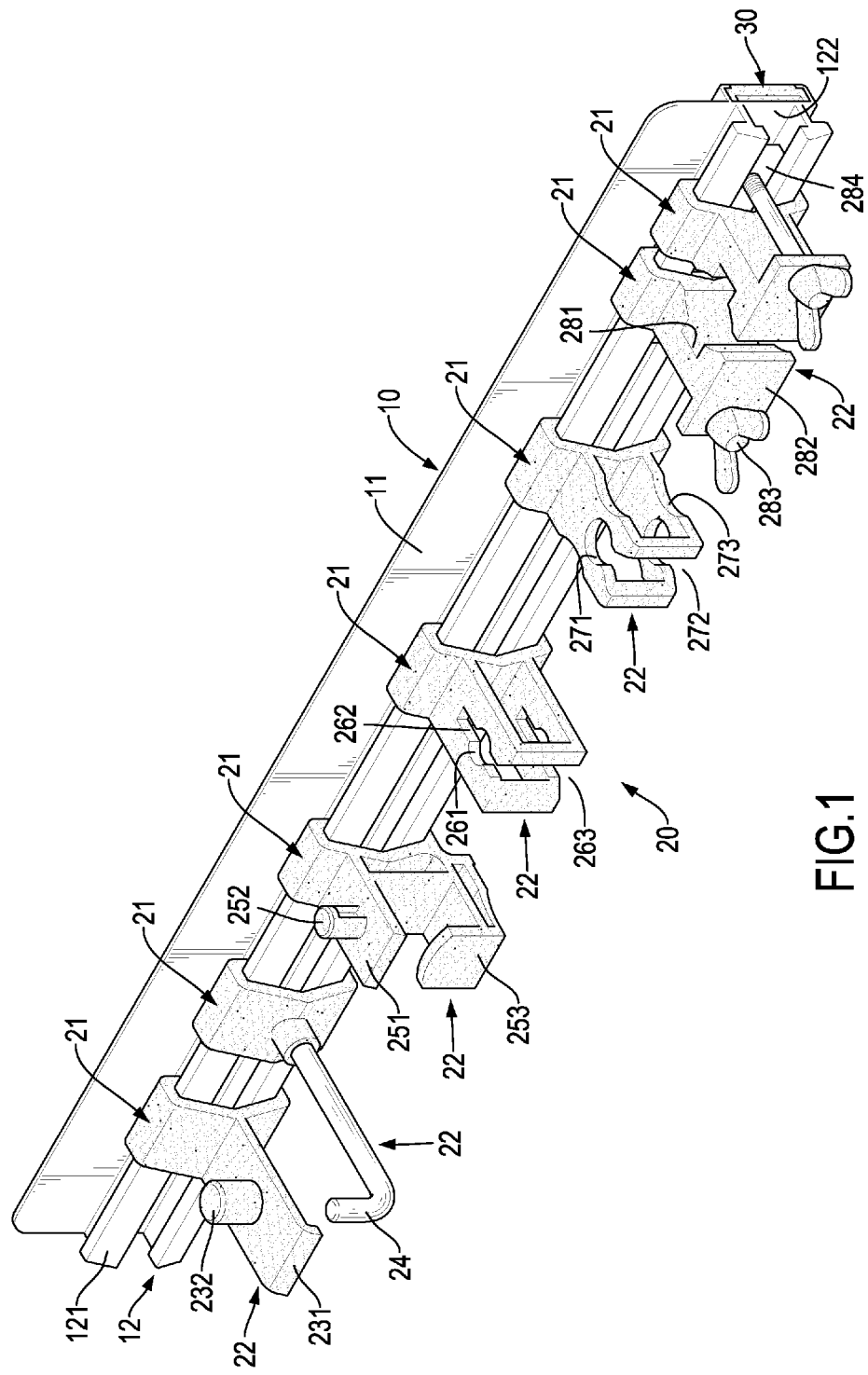
FIG. 1 is a front perspective view of a magnetic hanging frame in accordance with the present invention.
Figure 2:
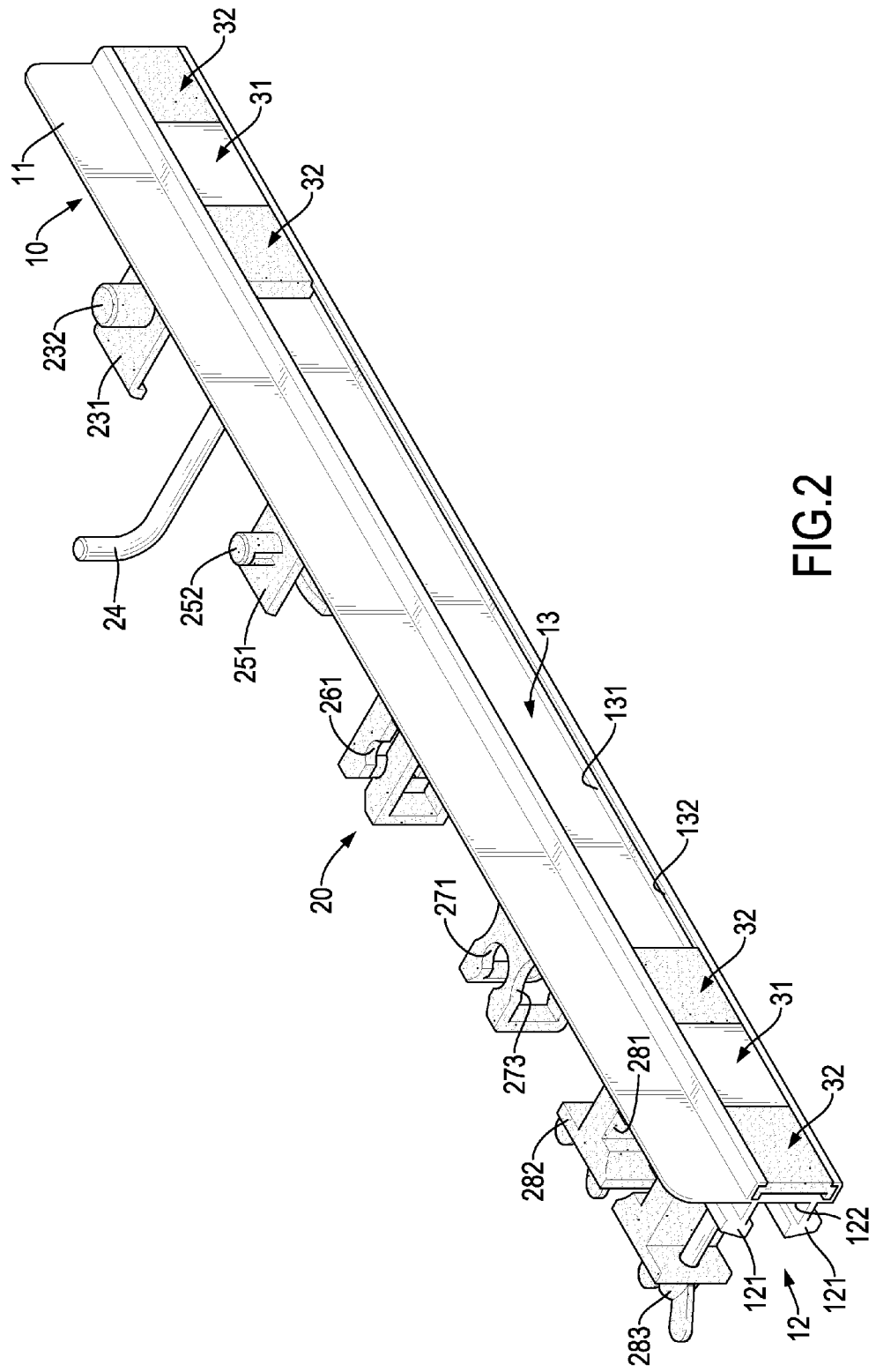
FIG. 2 is a rear perspective view of the magnetic hanging frame in FIG. 1.
Figure 3:
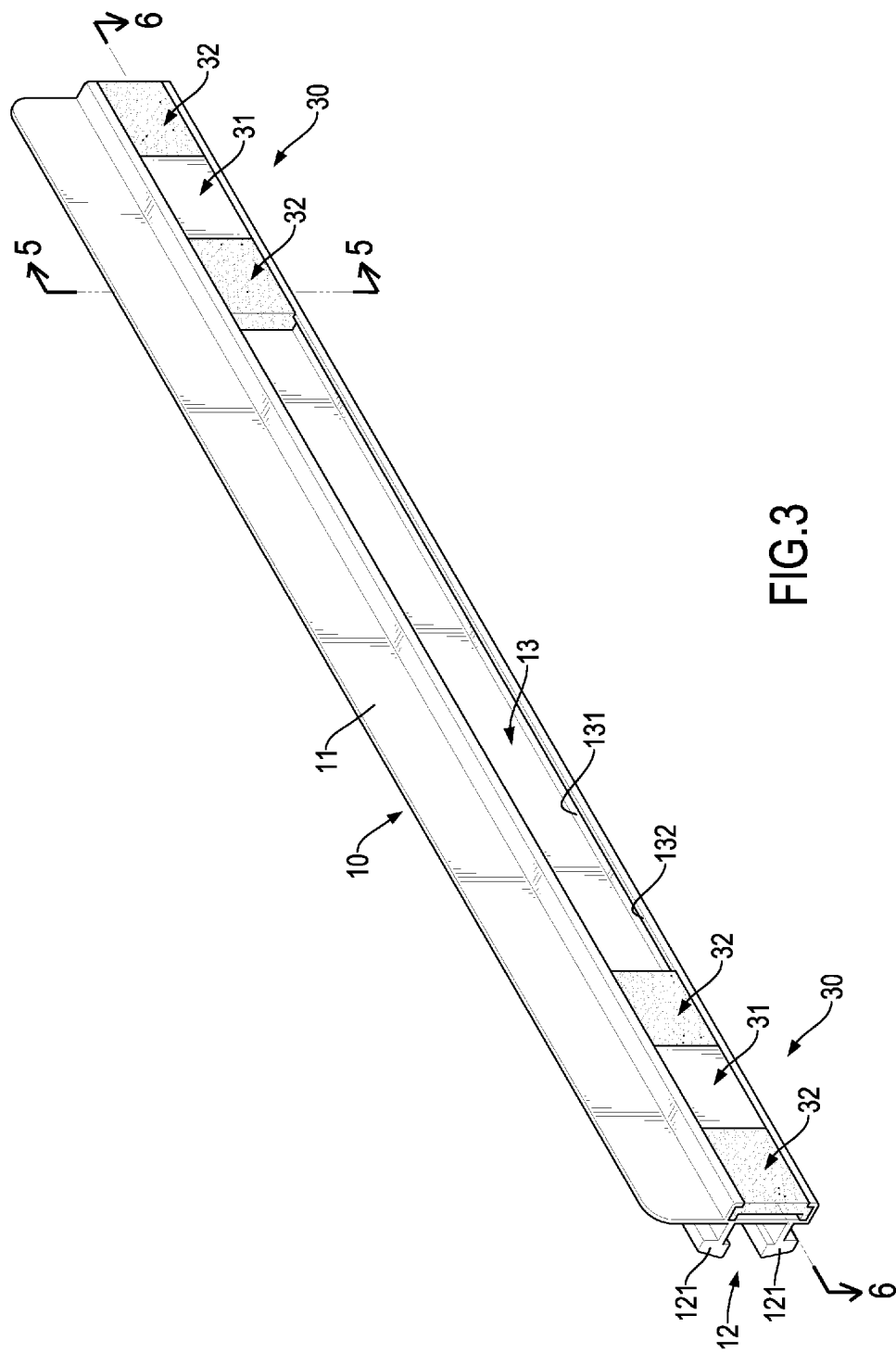
FIG. 3 is a further rear perspective view of the magnetic hanging frame in FIG. 1 without any holding element.

With reference to FIGS. 1 to 3, a magnetic hanging frame for hand tools in accordance with the present invention has a track disc 10, at least one holding element 20 and at least two magnetic devices 30.

The track disc 10 is made by aluminum extrusion, is elongated and has a baseboard 11, a track 12 and a mounting rack 13. The baseboard 11 is elongated and has a front surface and a rear surface. The track 12 is formed on and protrudes from the front surface of the baseboard 11 and may have two mounting arms 121 formed on and protruding from the front surface of the baseboard 11 and parallel with each other at an interval. In addition, the track 12 has a channel 122 formed between the mounting arms 121.

Figure 4:
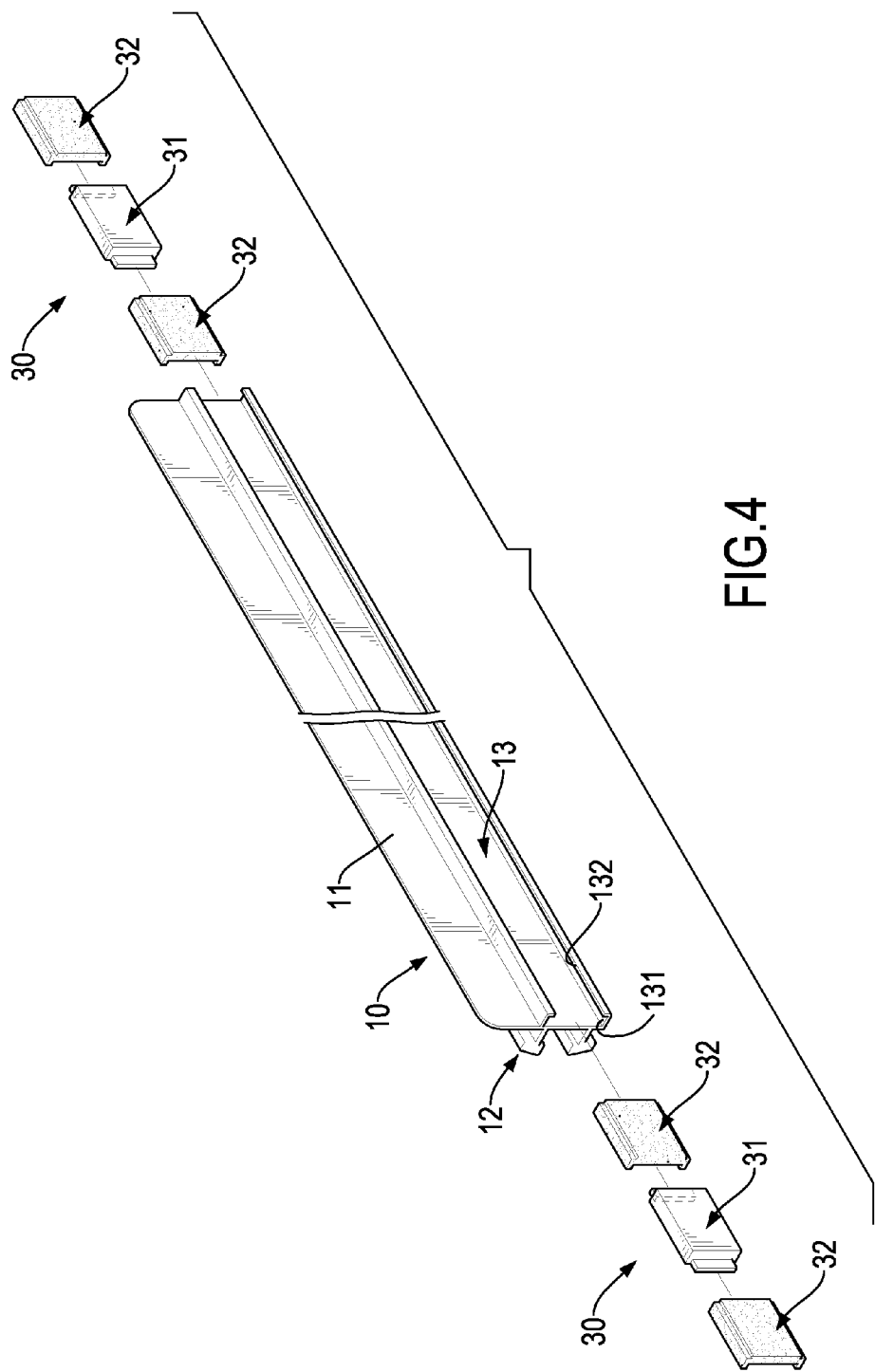
FIG. 4 is an exploded rear perspective view of the magnetic hanging frame in FIG. 3.
Figure 4A:
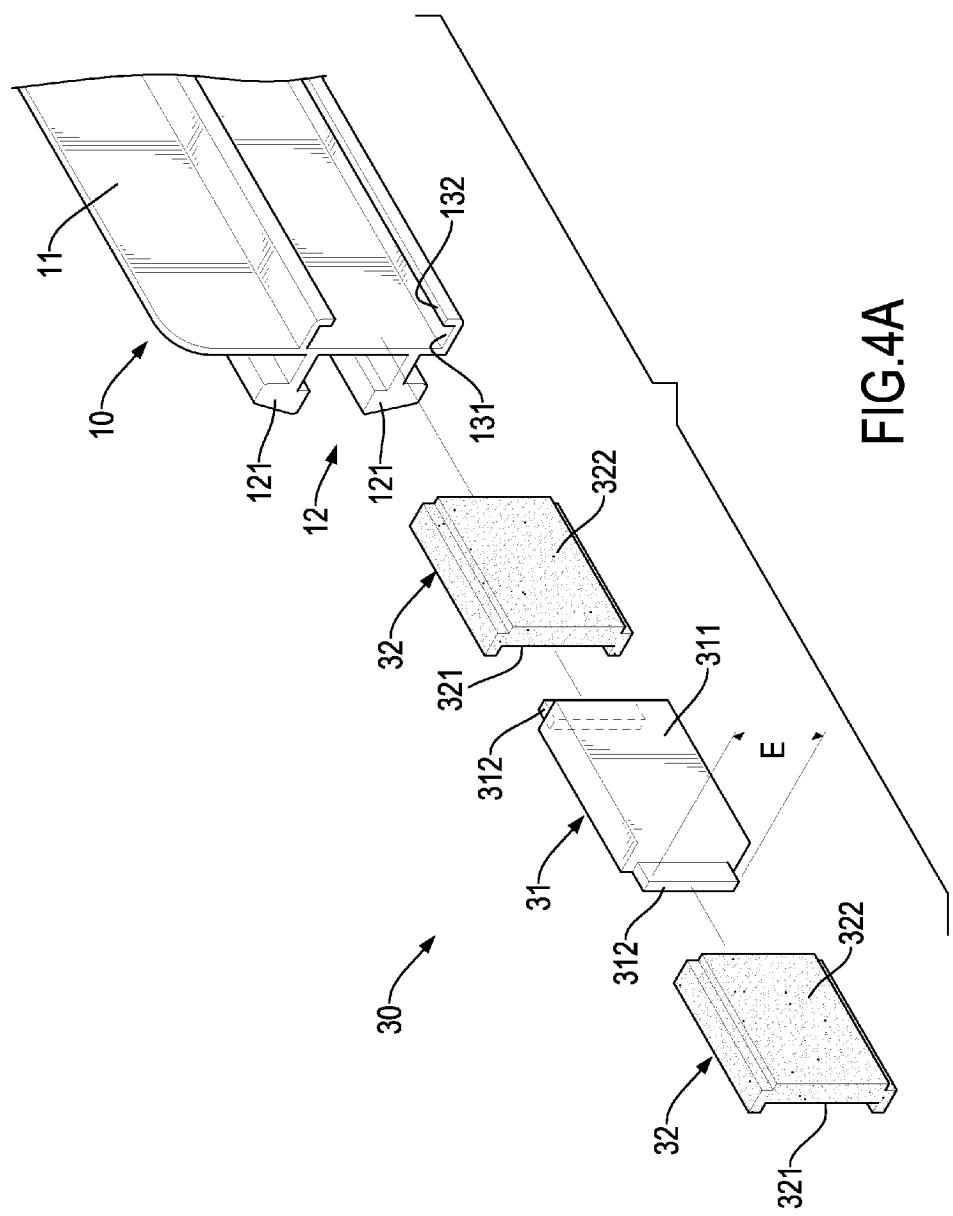
FIG. 4A is an enlarged and exploded rear perspective view of the magnetic hanging frame in FIG. 4.
Figure 5:
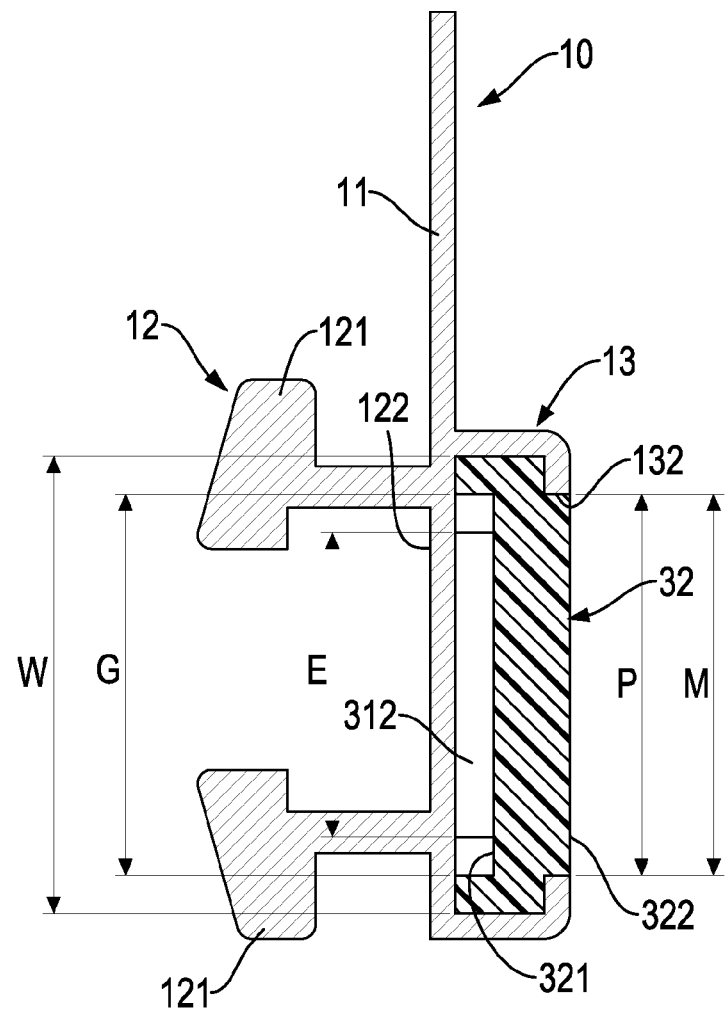
FIG. 5 is an enlarged side view in partial section of the magnetic hanging frame across line 5-5 in FIG. 3.

With reference to FIGS. 4 and 5, the mounting rack 13 is formed on and protrudes from the rear surface of the baseboard 11 has a width (W), an outer surface, an inner surface, two sides, two side openings 131 and a mouth 132. The side openings 131 are respectively formed through the sides of the mounting rack 13 and communicate with the mounting rack 13. The mouth 132 is formed through the outer surface of the mounting rack 13 and has a width (M) narrower than the width (W) of the mounting rack 13 (M<W).

With further reference to FIGS. 1 and 2, the at least one holding element 20 is slidably mounted on the track 12 of the track disc 10, and each one of the at least one holding element 20 has a hooking arm 21 and a holding mount 22. The hooking arm 21 is slidably mounted on the mounting arms 121 of the track 12 and has a front side. The holding mount 22 is formed on and protrudes from the front side of the hooking arm 21 to hold a hand tool and may have different embodiments.

Figure 7:
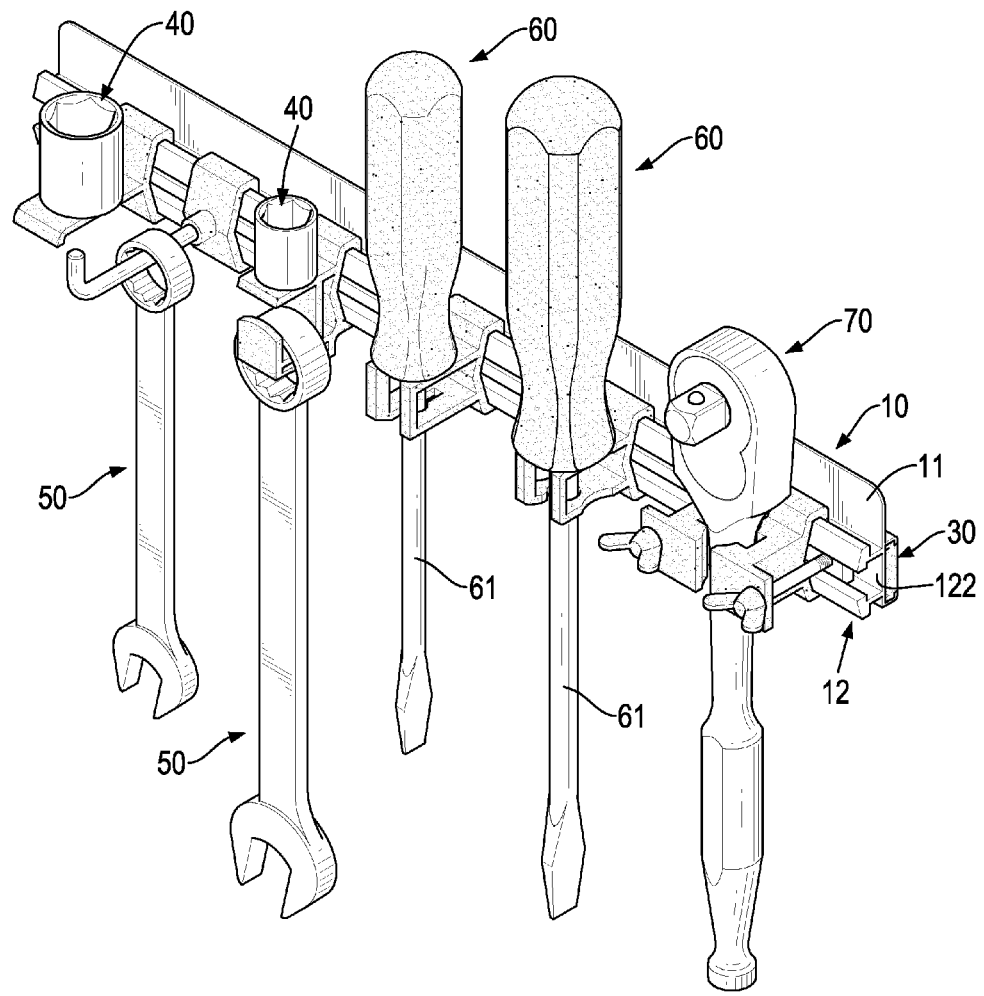
FIG. 7 is an operational perspective view of the magnetic hanging frame in FIG. 1, holding different kinds of hand tools.

Preferably, in a first embodiment of the holding mount 22, the holding mount 22 may have an extending panel 231 and a positioning rod 232. The extending panel 231 is formed on and protrudes forwardly from the front side of the hooking arm 21 and has an upper surface. The positioning rod 232 is formed on and protrudes upwardly from the upper surface of the extending panel 231 to hold a socket bit 40 as shown in FIG. 7. In a second embodiment of the holding mount 22, the holding mount 22 may have a hanging shaft 24 connected to the front side of the hooking arm 21 to hold a wrench 50 as shown in FIG. 7.

In a third embodiment of the holding mount 22, the holding mount 22 may have an extending panel 251, a positioning rod 252 and a hanging hook 253. The extending panel 251 is formed on and protrudes forwardly from the front side of the hooking arm 21 and has an upper surface. The positioning rod 252 is formed on and protrudes upwardly from the upper surface of the extending panel 251 to hold the socket bit 40. The hanging hook 253 is formed on and protrudes forwardly from the front side of the hooking arm 21 below the extending panel 251 to hold the wrench 50. Then, the third embodiment of the holding mount 22 can hold the socket bit 40 and the wrench 50 on the holding element 20 at the same time as shown in FIG. 7.

In a fourth embodiment of the holding mount 22, the holding mount 22 may have an upper surface, a lower surface, a front surface, a tool hole 261, a tool slot 262 and a mounting slit 263. The tool hole 261 is formed through the upper surface and the lower surface of the holding mount 22 to hold a shank 61 of a screwdriver 60. The tool slot 262 is formed through the upper surface and the lower surface of the holding mount 22 and communicates with the tool hole 261. The mounting slit 263 is formed through the upper surface, the front surface and the lower surface of the holding mount 22 and communicates with the tool hole 261 opposite to the tool slot 262.

In a fifth embodiment of the holding mount 22, the holding mount 22 may have an upper surface, a lower surface, a front surface, two sidewalls, a tool hole 271, a mounting slit 272 and two recesses 273. The tool hole 271 is formed through the upper surface and the lower surface of the holding mount 22 to hold the shank 61 of the screwdriver 60. The mounting slit 272 is formed through the upper surface, the front surface and the lower surface of the holding mount 22 and communicates with the tool hole 271. The recesses 273 are arc shaped and are respectively formed in the sidewalls of the holding mount 22 to allow elastic deformation of the holding mount 22.

In a sixth embodiment of the holding mount 22, the holding element 20 is composed of two half-clamping elements, and each one of the half-clamping elements has a hooking arm 21 and a holding mount 22. The hooking arm 21 is slidably mounted on the mounting arms 121 of the track 12 and has a front side.

The holding mount 22 is formed on and protrudes from the front side of the hooking arm 21 and may have a free end, an inner surface, an outer surface, a jaw 281, a side panel 282, a fixing element 283 and a clamping board 284. The jaw 281 may be curved, is formed in the inner surface of the holding mount 22 and faces to the jaw 281 of the other half-clamping element. The side panel 282 is formed on and protrudes transversally from the free end of the holding mount 22 and extends out of the outer surface of the holding mount 22. The fixing element 283 is mounted through the side panel 282 and is inserted into the channel 122 of the track 12 between the mounting arms 121. The clamping board 284 is mounted in the channel 122 of the track 12 and is securely connected to the fixing element 283 to hold the half-clamping element securely with the mounting arms 121 of the track 12. With reference to FIG. 7, a ratchet wrench 70 can be held between the jaws 281 of the holding mounts 22 of the holding element 20.

Figure 6:
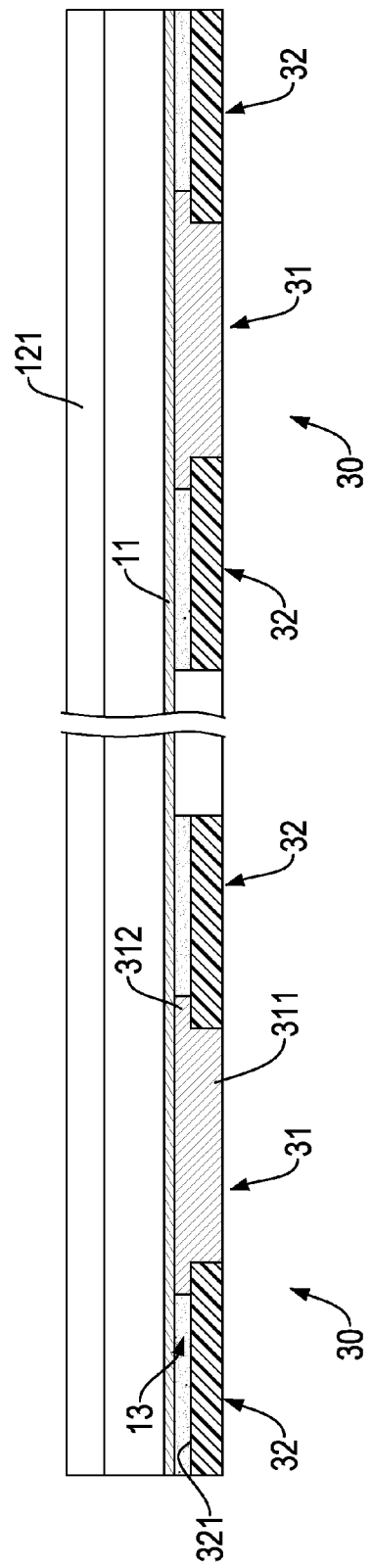
FIG. 6 is an enlarged side view in partial section of the magnetic hanging frame across line 6-6 in FIG. 3.

With referenced to FIGS. 4 to 6, the at least two magnetic devices 30 are connected to the track disc 10, and each one of the at least two magnetic devices 30 has a magnet mount 31 and two locating mounts 32.

The magnet mount 31 is made of metal, is magnetically mounted in the mounting rack 13 of the track disc 10 and has a magnetic body 311 and two extending wings 312. The magnetic body 311 is magnetically mounted in the mounting rack 13 of the track disc 10 via one of the side openings 131 and has two sidewalls. The extending wings 312 are respectively formed on and protrude from the sidewalls of the magnetic body 311, and each one of the extending wings 312 has a width (E).

The locating mounts 32 are mounted in the mounting rack 13 in a tight-fit condition beside the magnet mount 31, abut against the magnet mount 31 and each one of the locating mounts 32 has an inner surface, an outer surface, two sidewalls, a locating groove 321 and a middle protrusion 322. The inner surface of the locating mount 32 abuts the inner surface of the mounting rack 13. One of the sidewalls of the locating mount 32 abuts against the sidewalls of the magnetic body 311 of the magnet mount 31. The locating groove 321 is formed through the sidewalls of the locating mount 32, accommodates one of the extending wings 312 and has a width (G) wider than the width (E) of the extending wing 312 (G>E). That is, the magnet mount 31 is held in the mounting rack 13 by the locating grooves 321 of the locating mounts 32 mounted around the extending wings 312 of the magnet mount 31.

The middle protrusion 322 is outwardly formed on and protrudes from the outer surface of the locating mount 32, extends into the mouth 132 of the mounting rack 13 and has a width (P) approximatively equal to the width (M) of the mouth 132 of the mounting rack 13 (P≤M). Preferably, the at least two magnetic devices 30 are respectively mounted in the mounting rack 13 adjacent to the side openings 131 of the mounting rack 13.

Figure 8:
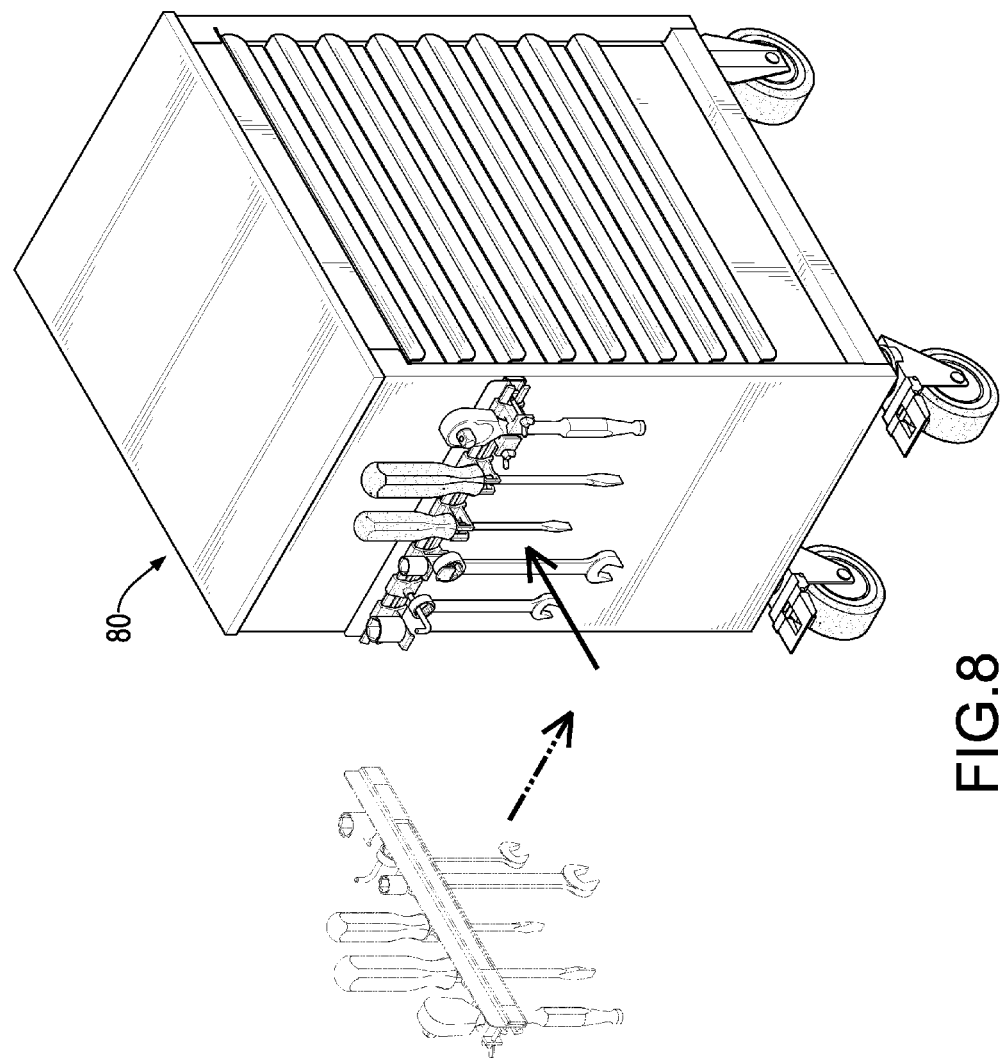
FIG. 8 is an operational perspective view of the magnetic hanging frame in FIG. 7, mounted on a sidewall of a tool cabinet.

In operation, with reference to FIGS. 7 and 8, the user can store different kinds of hand tools such as the socket bits 40, the wrenches 50, the screwdrivers 60 or the ratchet wrenches 70 by mounting the above-mentioned hand tools respectively in the different embodiments of the holding mount 22 to enable the above-mentioned hand tools to connect with the track disc 10. After mounting and storing the above-mentioned hand tools with the track disc 10, the user can mount the magnetic hanging frame on a sidewall of a tool cabinet 80 or a display frame conveniently by the magnetic forces of the magnet mounts 31 attracted to the sidewall of the tool cabinet 80. Then, the above-mentioned hand tools can be mounted and displayed on the sidewall of the tool cabinet 80 or the display frame with the magnetic hanging frame. Accordingly, no space in the tool cabinet 80 or the display frame is needed for storing the magnetic hanging frame.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A magnetic hanging frame for hand tools comprising:
    a track disc having
        a baseboard having
            a front surface; and
            a rear surface;
        a track formed on and protruding from the front surface of the baseboard; and
        a mounting rack formed on and protruding from the rear surface of the baseboard, the mounting rack having
            a width;
            an outer surface;
            an inner surface;
            two sides;
            two side openings respectively formed through the sides of the mounting rack and communicating with the mounting rack; and
            a mouth formed through the outer surface of the mounting rack and having a width narrower than the width of the mounting rack;
    at least one holding element slidably mounted on the track of the track disc; and at least two magnetic devices connected to the track disc, and each one of the at least two magnetic devices having
a magnet mount magnetically mounted in the mounting rack of the track disc and having;
a magnetic body magnetically mounted in the mounting rack of the track disc via one of the side openings and having two sidewalls; and
two extending wings respectively formed on and protruding from the sidewalls of the magnetic body, and each one of the extending wings having a width; and
two locating mounts mounted in the mounting rack in a tight-fit condition beside the magnet mount, abutting against the magnet mount, and each one of the locating mounts having;
an inner surface abutting the inner surface of the mounting rack;
an outer surface;
two sidewalls, and one of the sidewalls of the locating mount abutting against the sidewalls of the magnetic body of the magnet mount;
a locating groove formed through the sidewalls of the locating mount, the locating groove accommodating one of the extending wings and having a width wider than the width of the extending wing; and
a middle protrusion outwardly formed on and protruding from the outer surface of the locating mount, the middle protrusion extending into the mouth of the mounting rack and having a width approximatively equal to the width of the mouth of the mounting rack.

2. The magnetic hanging frame as claimed in claim 1, wherein the at least two magnetic devices are respectively mounted in the mounting rack adjacent to the side openings of the mounting rack.

3. The magnetic hanging frame as claimed in claim 2, wherein
the track has two mounting arms formed on and protruding from the front surface of the baseboard and parallel with each other at an interval; and
each one of the at least one holding element has
a hooking arm slidably mounted on the mounting arms of the track and having a front side; and
a holding mount formed on and protruding from the front side of the hooking arm to hold a hand tool.

4. The magnetic hanging frame as claimed in claim 3, wherein the holding mount of each one of the at least one holding element has
an extending panel formed on and protruding forwardly from the front side of the hooking arm and having an upper surface; and
a positioning rod formed on and protruding upwardly from the upper surface of the extending panel.

5. The magnetic hanging frame as claimed in claim 3, wherein the holding mount of each one of the at least one holding element has a hanging shaft connected to the front side of the hooking arm.

6. The magnetic hanging frame as claimed in claim 3, wherein the holding mount of each one of the at least one holding element has
an extending panel formed on and protruding forwardly from the front side of the hooking arm and having an upper surface;
a positioning rod formed on and protruding upwardly from the upper surface of the extending panel; and
a hanging hook formed on and protruding forwardly from the front side of the hooking arm below the extending panel.

7. The magnetic hanging frame as claimed in claim 3, wherein the holding mount of each one of the at least one holding element has
an upper surface;
a lower surface;
a front surface;
a tool hole formed through the upper surface and the lower surface of the holding mount;
a tool slot formed through the upper surface and the lower surface of the holding mount and communicating with the tool hole; and
a mounting slit formed through the upper surface, the front surface and the lower surface of the holding mount and communicating with the tool hole opposite to the tool slot.

8. The magnetic hanging frame as claimed in claim 3, wherein the holding mount of each one of the at least one holding element has
an upper surface;
a lower surface;
a front surface;
two sidewalls;
a tool hole formed through the upper surface and the lower surface of the holding mount;
a mounting slit formed through the upper surface, the front surface and the lower surface of the holding mount and communicating with the tool hole; and
two recesses being arc shaped and respectively formed in the sidewalls of the holding mount to allow elastic deformation of the holding mount.

9. The magnetic hanging frame as claimed in claim 2, wherein
the track has;
two mounting arms formed on and protruding from the front surface of the baseboard and parallel with each other at an interval; and
a channel formed between the mounting arms; and
the at least one holding element is composed of two half-clamping elements, and each one of the half-clamping elements has;
a hooking arm slidably mounted on the mounting arms of the track and having a front side; and
a holding mount formed on and protruding from the front side of the hooking arm and having;
a free end;
an inner surface;
an outer surface;
a jaw formed in the inner surface of the holding mount and facing to the jaw of the other half-clamping element;
a side panel formed on and protruding transversally from the free end of the holding mount and extending out of the outer surface of the holding mount;
a fixing element mounted through the side panel and inserted into the channel of the track between the mounting arms; and
a clamping board mounted in the channel of the track and securely connected to the fixing element to hold the half-clamping element securely with the mounting arms of the track.

10. The magnetic hanging frame as claimed in claim 1, wherein the track has two mounting arms formed on and protruding from the front surface of the baseboard and parallel with each other at an interval; and each one of the at least one holding element has;
a hooking arm slidably mounted on the mounting arms of the track and having a front side; and
a holding mount formed on and protruding from the front side of the hooking arm to hold a hand tool.

11. The magnetic hanging frame as claimed in claim 10, wherein the holding mount of each one of the at least one holding element has;
an extending panel formed on and protruding forwardly from the front side of the hooking arm and having an upper surface; and
a positioning rod formed on and protruding upwardly from the upper surface of the extending panel.

12. The magnetic hanging frame as claimed in claim 10, wherein the holding mount of each one of the at least one holding element has a hanging shaft connected to the front side of the hooking arm.

13. The magnetic hanging frame as claimed in claim 10, wherein the holding mount of each one of the at least one holding element has;
an extending panel formed on and protruding forwardly from the front side of the hooking arm and having an upper surface;
a positioning rod formed on and protruding upwardly from the upper surface of the extending panel; and
a hanging hook formed on and protruding forwardly from the front side of the hooking arm below the extending panel.

14. The magnetic hanging frame as claimed in claim 10, wherein the holding mount of each one of the at least one holding element has;
an upper surface;
a lower surface;
a front surface;
a tool hole formed through the upper surface and the lower surface of the holding mount;
a tool slot formed through the upper surface and the lower surface of the holding mount and communicating with the tool hole; and
a mounting slit formed through the upper surface, the front surface and the lower surface of the holding mount and communicating with the tool hole opposite to the tool slot.

15. The magnetic hanging frame as claimed in claim 10, wherein the holding mount of each one of the at least one holding element has
an upper surface;
a lower surface;
a front surface;
two sidewalls;
a tool hole formed through the upper surface and the lower surface of the holding mount;
a mounting slit formed through the upper surface, the front surface and the lower surface of the holding mount and communicating with the tool hole; and
two recesses being arc shaped and respectively formed in the sidewalls of the holding mount to allow elastic deformation of the holding mount.

16. The magnetic hanging frame as claimed in claim 1, wherein
the track has;
two mounting arms formed on and protruding from the front surface of the baseboard and parallel with each other at an interval; and
a channel formed between the mounting arms; and
the at least one holding element is composed of two half-clamping elements, and each one of the half-clamping elements has;
a hooking arm slidably mounted on the mounting arms of the track and having a front side; and
a holding mount formed on and protruding from the front side of the hooking arm and having;
a free end;
an inner surface;
an outer surface;
a jaw formed in the inner surface of the holding mount and facing to the jaw of the other half-clamping element;
a side panel formed on and protruding transversally from the free end of the holding mount and extending out of the outer surface of the holding mount;
a fixing element mounted through the side panel and inserted into the channel of the track between the mounting arms; and
a clamping board mounted in the channel of the track and securely connected to the fixing element to hold the half-clamping element securely with the mounting arms of the track.

* * * * *